No. 754,372. PATENTED MAR. 8, 1904.
M. HUTIN & M. LEBLANC.
SYSTEM OF ALTERNATING CURRENT TRANSFORMATION.
APPLICATION FILED NOV. 19, 1903.
NO MODEL.
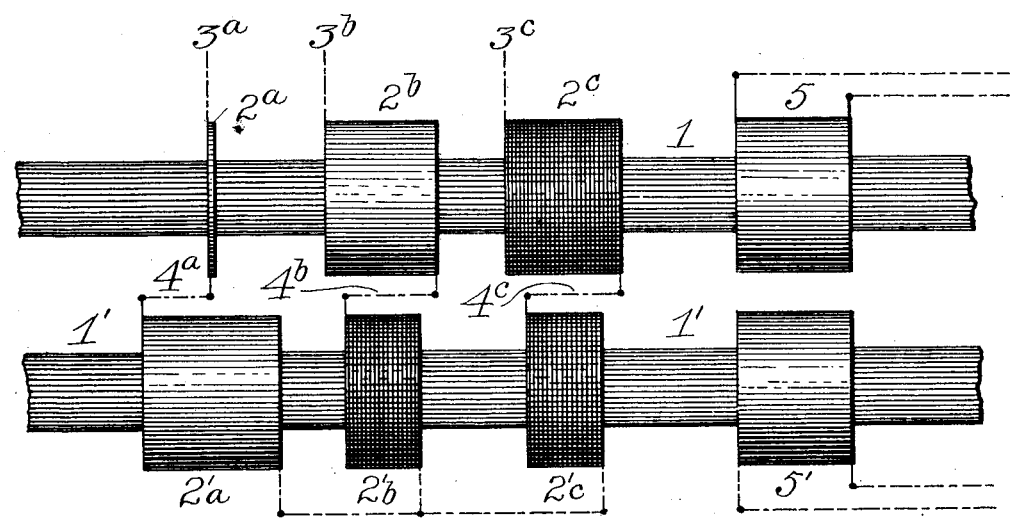
WITNESSES:
Edwin L. Jewell
F. T. Chapman
INVENTORS:
Maurice Hutin,
Maurice Leblanc,
By Lyons & Bissing Attorneys.

No. 754,372. Patented March 8, 1904.

UNITED STATES PATENT OFFICE.

MAURICE HUTIN AND MAURICE LEBLANC, OF PARIS, FRANCE, ASSIGNORS, BY MESNE ASSIGNMENTS, TO GEORGE WESTINGHOUSE, OF PITTSBURG, PENNSYLVANIA.

SYSTEM OF ALTERNATING-CURRENT TRANSFORMATION.

SPECIFICATION forming part of Letters Patent No. 754,372, dated March 8, 1904.

Original application filed April 3, 1895, Serial No. 544,224. Divided and this application filed November 19, 1903. Serial No. 181,883. (No model.)

*To all whom it may concern:*

Be it known that we, MAURICE HUTIN and MAURICE LEBLANC, citizens of the Republic of France, and residents of Paris, in the Republic of France, have invented certain new and useful Improvements in Systems of Alternating-Current Transformation, of which the following is a specification.

Our invention relates to apparatus for the production of two separate alternating magnetic fluxes that are in quadrature and for the generation of alternating currents thereby in accordance with the methods set forth in our application, Serial No. 544,224, filed April 3, 1895, of which this is a division.

An embodiment of our invention is illustrated in the accompanying drawing, which shows two inductional transformers wound and connected in accordance with our invention.

The drawing represents the case when either three-phase or two-phase currents are used for the production of two-phase magnetic fluxes; but the application of the principles of the invention to any number of dephased currents will be clear from the explanation of the use of the three-phase currents.

In the drawing, 1 and 1' represent the cores of two converters, which cores, it will be understood, are in practice closed upon themselves, generally ring-shaped, but which are here represented in part only and straightened out. Upon these cores are the coils $2_a$ $2_b$ $2_c$ and $2'_a$ $2'_b$ $2'_c$, which for the time being we will call the "primary" coils. They are of different sizes, as is represented by their different widths, and on each core two of these three coils are wound in one direction, and one coil is wound in the opposite direction, as is represented by differences of shading. The coils $2_a$ and $2'_a$, $2_b$ and $2'_b$, $2_c$ and $2'_c$ are connected together, respectively, in series by conductors $4_a$, $4_b$, and $4_c$, while the free terminals of coils $2'_a$ $2'_b$ $2'_c$ are joined together. With the free terminals of coils $2_a$, $2_b$, and $2_c$ are connected the three line-wires $3_a$ $3_b$ $3_c$, respectively, conveying three-phase currents from any distant source of electromotive force.

Supposing now that at any moment $t$ of the period T the currents supplied by the three wires are respectively $$I_a = A \sin. 2\pi \frac{t}{T},$$

$$I_b = A \sin. 2\pi \left(\frac{t}{T} + \frac{1}{3}\right),$$

$$I_c = A \sin. 2\pi \left(\frac{t}{T} + \frac{2}{3}\right),$$

wherein A designates the maximum intensity of the current and T the period of the same. Under these conditions the incoming current $I_a$ traverses the coils $2_a$ and $2'_a$, the incoming current $I_b$ traverses the coils $2_b$ and $2'_b$, and the incoming current $I_c$ traverses the coils $2_c$ and $2'_c$.

As before stated, the different coils of the two converters are not of equal size. They are graduated for each transformer, so that the numbers of their convolutions are related to each other either as the sines or as the cosines of the arcs representing the lags of the incoming currents from some arbitrarily-selected current, while the convolutions of the conjugated coils in the two transformers—namely, $2_a$ and $2'_a$, $2_b$ and $2'_b$, $2_c$ and $2'_c$—are related to each other as the sines and cosines of the same arcs. These lags of the incoming currents from some arbitrarily selected or assumed current we shall hereinafter refer to simply as the "current lag." Following this rule and designating by $\gamma$ an arbitrarily-chosen constant number of turns of coil-winding and by $\alpha$ any arbitrary constant quantity we make the number of convolutions for coil $2_a$, $\gamma \sin. 2\pi \alpha$;

for coil $2'_a$, $\gamma \cos. 2\pi \alpha$;

for coil $2_b$, $\gamma \sin. 2\pi (\alpha + \frac{1}{3};)$ for coil $2'_b$, $\gamma \cos. 2\pi (\alpha + \frac{1}{3};)$ for coil $2_c$, $\gamma \sin. 2\pi (\alpha + \frac{2}{3};)$ for coil $2'_c$, $\gamma \cos. 2\pi (\alpha + \frac{2}{3}.)$ The number of alternating ampere-turns developed about the core 1 will therefore be $$\gamma A [\sin. 2\pi \frac{t}{T} \sin. 2\pi \alpha +$$
$$\sin. 2\pi \left(\frac{t}{T} + \frac{1}{3}\right) \sin. 2\pi (\alpha + \frac{1}{3}) +$$
$$\sin. 2\pi \left(\frac{t}{T} + \frac{2}{3}\right) \sin. 2\pi (\alpha + \frac{2}{3})]$$

which expression may be reduced to $$\frac{2}{3} \gamma A \cos. 2\pi \left(\frac{t}{T} - \alpha.\right)$$

Similarly the number of alternating ampere-turns developed about the core 1' will be $$\frac{2}{3} \gamma A \sin. 2\pi \left(\frac{t}{T} - \alpha.\right)$$

The meaning of these last two expressions is that in each core the same number of ampere-turns will be developed; but the phases of the same will be shifted with reference to each other by one quadrant. The effect of this is, as is readily understood, that the magnetic fluxes in the two transformer-cores will also be equal, but will be dephased by reference to each other by one quadrant. From this it follows immediately that the currents induced in any secondary coils 5 5' of the two transformers will also be dephased with reference to each other by one-quarter of a period.

It will now be evident to those skilled in the art that if our general rule of winding and connecting the coils of two transformers is followed we are enabled to produce by any number of dephased alternating currents two independent alternating magnetic fluxes which are dephased with reference to each other by a quarter of a period. Thus, for instance, if we use J currents they must be dephased with reference to each other by $\frac{1}{J}$ of a period. These currents will therefore be:

$$I_a = A \sin. 2\pi \frac{t}{T},$$
$$I_b = A \sin. 2\pi \left(\frac{t}{T} + \frac{1}{J},\right)$$
$$I_c = A \sin. 2\pi \left(\frac{t}{T} + \frac{2}{J},\right)$$
. . . . . . . . . . . . . . . . . . . . . . . . . . . . . . .
$$I_{J-1} = A \sin. 2\pi \left(\frac{t}{T} + \frac{J-2}{J}.\right)$$
$$I_J = A \sin. 2\pi \left(\frac{t}{T} + \frac{J-1}{J}.\right)$$

The number of windings of the primary coils on core 1 will then be in accordance with the principle of our invention, for coil $2_a$, $\gamma \sin. 2\pi \alpha$;

for coil $2_b$, $\gamma \sin. 2\pi (\alpha + \frac{1}{J};)$ for coil $2_c$, $\gamma \sin. 2\pi (\alpha + \frac{2}{J};)$

. . . . . . . . . . . . . . . . . . . . . . . . . . . . . . .

for coil $2_{J-2}$, $\gamma \sin. 2\pi (\alpha + \frac{J-2}{J},)$ and for coil $2_{J-1}$, $\gamma \sin. 2\pi (\alpha + \frac{J-1}{J},)$ and similarly for coil $2'_a$, $\gamma \cos. 2\pi \alpha$;

for coil $2'_b$, $\gamma \cos. 2\pi (\alpha + \frac{1}{J};)$ for coil $2'_c$, $\gamma \cos. 2\pi (\alpha + \frac{2}{J};)$

. . . . . . . . . . . . . . . . . . . . . . . . . . . . . . .

for coil $2'_{J-2}$, $\gamma \cos. 2\pi (\alpha + \frac{J-2}{J},)$ and for coil $2'_{J-1}$, $\gamma \cos. 2\pi (\alpha + \frac{J-1}{J}.)$ The ampere-turns developed about the core 1 will then be $\frac{J-1}{J} \gamma A \cos. 2\pi, \left(\frac{t}{T} - \alpha,\right)$ and similarly the ampere-turns developed about the core 1' will be $\frac{J-1}{J} \gamma A \sin. 2\pi \left(\frac{t}{T} - \alpha.\right)$ The corresponding alternating magnet fluxes produced in the two cores will therefore be dephased by one quarter of a period and so will the alternating currents thereby induced in any secondary coils 5 5' upon the same cores. The result of our method of procedure is, therefore, precisely the same as if each transformer had only a single primary coil upon its core and as if each coil were traversed by a separate alternating current which is in quadrature with the other current. We are thus enabled to accomplish by the use of polyphase currents that which heretofore could only be accomplished by two-phase currents—namely, the production of two-phase magnetic fluxes. Moreover, the system is obviously reversible—that is to say, by two-phase alternating magnetic fluxes, however produced, multiphase currents can be generated, which ordinarily means the conversion of two-phase currents of any tension into three or more phase currents of the same or any other tension. In that case the coils 5 5' may be the primary coils and the coils $2_a$ $2_b$, &c., become the secondary coils.

It is quite obvious that for the purposes of our invention the coils of the two transformers may be arranged upon their cores in any suitable manner and that we are not limited to any particular shape or to any details of construction, so long as the fundamental principles herein set forth are observed.

Having now fully described our invention, we claim and desire to secure by Letters Patent—

1. An apparatus for generating two separate alternating magnetic fluxes in quadrature, by multiphase alternating currents, and vice versa, consisting of two inductional transformers each having as many coils as there are multiphase currents used or generated, the number of windings of said coils being graduated for one transformer in the ratio of the sines of the lags of the currents which traverse them and for the other transformer in the ratio of the cosines of the same lags, the homologous coils being connected in series, and an independent coil or coils for each transformer, substantially as described.

2. A system of alternating-current transformation comprising two separate magnetic cores, one wound with a set of coils graduated in accordance with a sine law and the other with a set of coils graduated in accordance with a cosine law, the homologous coils of the two sets being connected in series and with a multiphase line, and a separate coil or coils for each core connected with a quarter-phase line, substantially as described.

In testimony whereof we have signed our names to this specification in the presence of two subscribing witnesses.

MAURICE HUTIN.
MAURICE LEBLANC.

Witnesses:
ALBERT DELAS,
AUGUSTUS E. INGRAM.